US011427215B2

(12) United States Patent
Wang et al.

(10) Patent No.: US 11,427,215 B2
(45) Date of Patent: Aug. 30, 2022

(54) SYSTEMS AND METHODS FOR GENERATING A TASK OFFLOADING STRATEGY FOR A VEHICULAR EDGE-COMPUTING ENVIRONMENT

(71) Applicant: Toyota Motor Engineering & Manufacturing North America, Inc., Plano, TX (US)

(72) Inventors: Haoxin Wang, Mountain View, CA (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 209 days.

(21) Appl. No.: 16/944,522

(22) Filed: Jul. 31, 2020

(65) Prior Publication Data
US 2022/0032933 A1 Feb. 3, 2022

(51) Int. Cl.
*B60W 50/00* (2006.01)
*B60W 50/06* (2006.01)
(Continued)

(52) U.S. Cl.
CPC ............ *B60W 50/06* (2013.01); *B60W 30/14* (2013.01); *G01C 21/3804* (2020.08);
(Continued)

(58) Field of Classification Search
CPC .. B60W 50/06; B60W 30/14; B60W 2556/40; B60W 2556/45; B60W 2554/80;
(Continued)

(56) References Cited

U.S. PATENT DOCUMENTS 10,235,480 B2   3/2019   Broodney et al.
10,489,222 B2   11/2019  Sathyanarayana et al.
(Continued)

FOREIGN PATENT DOCUMENTS

CN   109756378 A  *  5/2019  ............ H04L 12/24
CN   110213796        9/2019

OTHER PUBLICATIONS

Lu et al., "Optimization of lightweight task offloading strategy for mobile edge computing based on deep reinforcement learning", Future Generation Computer Systems 102 (2020) 847-861.
(Continued)

*Primary Examiner* — Elaine Gort
*Assistant Examiner* — Brittany Renee Peko
(74) *Attorney, Agent, or Firm* — Christopher G Darrow; Darrow Mustafa PC

(57) ABSTRACT

Systems and methods described herein relate to generating a task offloading strategy for a vehicular edge-computing environment. One embodiment simulates a vehicular edge-computing environment in which one or more vehicles perform computational tasks whose data is partitioned into segments and performs, for each of a plurality of segments, a Deep Reinforcement Learning (DRL) training procedure that includes receiving state-space information regarding the one or more vehicles and one or more intermediate network nodes; inputting the state-space information to a policy network; generating, from the policy network, an action concerning a current segment; and assigning a reward to the policy network for the action in accordance with a predetermined reward function. This embodiment produces, via the DRL training procedure, a trained policy network embodying an offloading strategy for segmentation offloading of computational tasks from vehicles to one or more of an edge server and a cloud server.

20 Claims, 6 Drawing Sheets

(51) Int. Cl.
*H04L 67/1014* (2022.01)
*H04W 4/44* (2018.01)
*G06F 9/48* (2006.01)
*G06N 3/08* (2006.01)
*G01C 21/00* (2006.01)
*B60W 30/14* (2006.01)

(52) U.S. Cl.
CPC .............. *G06F 9/4881* (2013.01); *G06N 3/08* (2013.01); *H04L 67/1014* (2013.01); *H04W 4/44* (2018.02); *B60W 2520/06* (2013.01); *B60W 2520/10* (2013.01); *B60W 2554/80* (2020.02); *B60W 2556/40* (2020.02); *B60W 2556/45* (2020.02)

(58) Field of Classification Search
CPC ......... B60W 2520/06; B60W 2520/10; H04W 4/44; G01C 21/3804; G06F 9/4881; G06N 3/08
See application file for complete search history.

(56) References Cited

U.S. PATENT DOCUMENTS

| | | | |
|---|---|---|---|
| 10,637,142 | B1 | 4/2020 | Tran et al. |
| 10,659,526 | B2 | 5/2020 | Khalid |
| 11,070,982 | B1* | 7/2021 | Shaw ................. H04W 12/122 |
| 2013/0060553 | A1 | 3/2013 | Patel et al. |
| 2016/0291826 | A1 | 10/2016 | Verzano |
| 2018/0183855 | A1 | 6/2018 | Sabella et al. |
| 2019/0102676 | A1 | 4/2019 | Nazari et al. |
| 2019/0138934 | A1* | 5/2019 | Prakash ................. G06N 20/00 |
| 2019/0141120 | A1 | 5/2019 | Bemat et al. |
| 2019/0324822 | A1 | 10/2019 | Gottin et al. |
| 2019/0327506 | A1 | 10/2019 | Zou et al. |
| 2019/0356556 | A1 | 11/2019 | Vicat-Blanc |
| 2019/0377592 | A1 | 12/2019 | Verma et al. |
| 2020/0021537 | A1 | 1/2020 | Oliveira et al. |
| 2020/0036808 | A1 | 1/2020 | Yu |
| 2020/0065704 | A1 | 2/2020 | Nag et al. |
| 2021/0117860 | A1* | 4/2021 | Ergen ................... G06N 20/00 |
| 2021/0183244 | A1* | 6/2021 | Malhan .................. G08G 1/09 |

OTHER PUBLICATIONS

Moubayed et al., "Edge-enabled V2X Service Placement for Intelligent Transportation Systems", found at: arXiv:2001.06288v1 [eess.SP] Jan. 13, 2020.

Sun et al., "Adaptive Learning-Based Task Off-loading for Vehicular Edge Computing Systems", found at: arXiv:1901.05205v1 [cs.IT] Jan. 16, 2019.

Dlamini et al., "Core Network Management Procedures for self-organized and sustainable 5G cellular networks", found at: arXiv:1909.09097v1 [eess.SP] Sep. 19, 2019.

Huang et al., "Scheduling for Mobile Edge Computing with Random user Arrivals", found at: arXiv:2004.07553v1 [cs.IT] Apr. 16, 2020.

Ren et al., "Latency Optimization For Resource Allocation in Mobile-edge Computation offloading", found at: arXiv:1704.00163v1 [cs.IT] 1 Apr 201.

U.S. Appl. No. 16/944,645 titled "Systems and Methods for Simulating Edge-Computing Deployment in Diverse Terrains", filed Jul. 31, 2020.

* cited by examiner

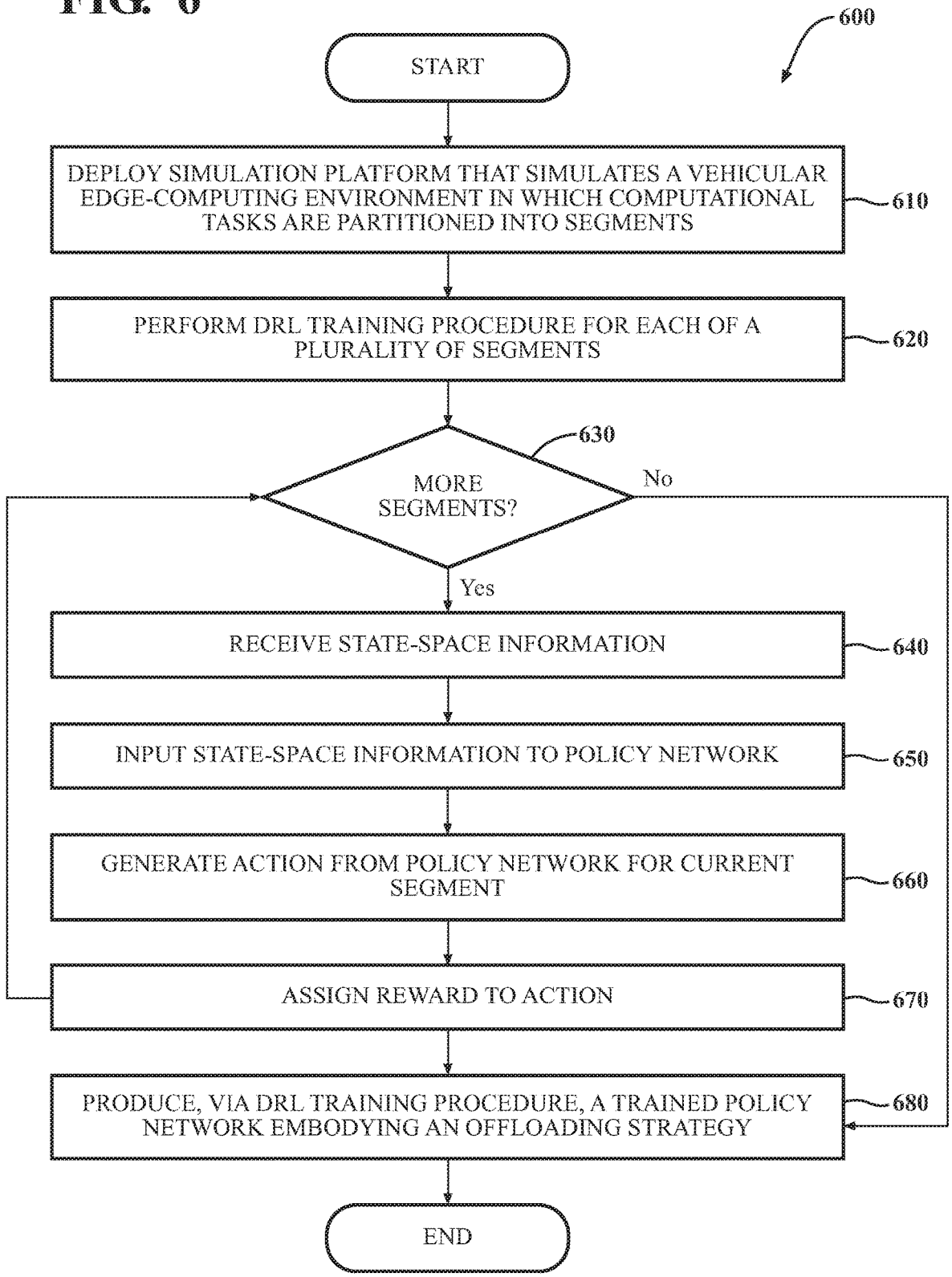

SYSTEMS AND METHODS FOR GENERATING A TASK OFFLOADING STRATEGY FOR A VEHICULAR EDGE-COMPUTING ENVIRONMENT

TECHNICAL FIELD

The subject matter described herein relates in general to connected vehicles and, more specifically, to systems and methods for generating a task offloading strategy for a vehicular edge-computing environment.

BACKGROUND

Connected vehicles—vehicles that can communicate bidirectionally over a network with infrastructure systems and, in some applications, other vehicles—are becoming mainstream and are expected to be widely deployed within a few years. One technology that supports this connected-vehicle future is edge computing. Edge computing can benefit connected vehicles in several ways. For example, edge computing can enable computation-intensive and latency-critical applications despite the computation-resource limitations of the connected vehicles themselves. Also, edge computing permits connected vehicles to share important data such as sensor data with one another. One aspect of vehicular edge computing is developing practical, effective task offloading strategies for diverse terrains and infrastructure deployments.

SUMMARY

Embodiments of a system for generating a task offloading strategy for a vehicular edge-computing environment are presented herein. In one embodiment, the system comprises one or more processors and a memory communicably coupled to the one or more processors. The memory stores a simulation module including instructions that when executed by the one or more processors cause the one or more processors to deploy a simulation platform that simulates a vehicular edge-computing environment in which one or more vehicles perform computational tasks associated with one or more vehicular applications. Data associated with the computational tasks is partitioned into segments, the simulation platform includes a simulated edge server, the simulated edge server includes a policy network, and the policy network includes a neural network. The memory also stores a Deep Reinforcement Learning (DRL) module including instructions that when executed by the one or more processors cause the one or more processors to perform, for each of a plurality of segments, a Deep Reinforcement Learning (DRL) training procedure in which the one or more processors receive, at the simulated edge server, state-space information regarding the one or more vehicles and one or more intermediate network nodes, the one or more intermediate network nodes including at least one of base stations and roadside units; input the state-space information to the policy network; generate, from the policy network, an action concerning a current segment of a particular computational task associated with a particular vehicle among the one or more vehicles, the action including one of offloading the current segment via a specific base station, offloading the current segment via a specific roadside unit, and holding the current segment in a data buffer of the particular vehicle; and assign a reward to the policy network for the action in accordance with a predetermined reward function. The instructions in the DRL module cause the one or more processors, via the DRL training procedure, to produce a trained policy network embodying an offloading strategy for segmentation offloading of computational tasks from vehicles to one or more of an edge server and a cloud server.

Another embodiment is a non-transitory computer-readable medium for generating a task offloading strategy for a vehicular edge-computing environment and storing instructions that when executed by one or more processors cause the one or more processors to deploy a simulation platform that simulates a vehicular edge-computing environment in which one or more vehicles perform computational tasks associated with one or more vehicular applications. Data associated with the computational tasks is partitioned into segments, the simulation platform includes a simulated edge server, the simulated edge server includes a policy network, and the policy network includes a neural network. The instructions also cause the one or more processors to perform, for each of a plurality of segments, a Deep Reinforcement Learning (DRL) training procedure in which the one or more processors receive, at the simulated edge server, state-space information regarding the one or more vehicles and one or more intermediate network nodes, the one or more intermediate network nodes including at least one of base stations and roadside units; input the state-space information to the policy network; generate, from the policy network, an action concerning a current segment of a particular computational task associated with a particular vehicle among the one or more vehicles, the action including one of offloading the current segment via a specific base station, offloading the current segment via a specific roadside unit, and holding the current segment in a data buffer of the particular vehicle; and assign a reward to the policy network for the action in accordance with a predetermined reward function. The instructions also cause the one or more processors to produce, via the DRL training procedure, a trained policy network embodying an offloading strategy for segmentation offloading of computational tasks from vehicles to one or more of an edge server and a cloud server.

Another embodiment is a method of simulating edge-computing deployment in diverse terrains, the method comprising deploying a simulation platform that simulates a vehicular edge-computing environment in which one or more vehicles perform computational tasks associated with one or more vehicular applications. Data associated with the computational tasks is partitioned into segments, the simulation platform includes a simulated edge server, the simulated edge server includes a policy network, and the policy network includes a neural network. The method also includes performing, for each of a plurality of segments, a Deep Reinforcement Learning (DRL) training procedure that includes receiving, at the simulated edge server, state-space information regarding the one or more vehicles and one or more intermediate network nodes, the one or more intermediate network nodes including at least one of base stations and roadside units; inputting the state-space information to the policy network; generating, from the policy network, an action concerning a current segment of a particular computational task associated with a particular vehicle among the one or more vehicles, the action including one of offloading the current segment via a specific base station, offloading the current segment via a specific roadside unit, and holding the current segment in a data buffer of the particular vehicle; and assigning a reward to the policy network for the action in accordance with a predetermined reward function. The method also includes producing, via the DRL training procedure, a trained policy network embodying an offloading strategy for segmentation offloading of computational tasks from vehicles to one or more of an edge server and a cloud server.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 is a flowchart of a method of generating a task offloading strategy for a vehicular edge-computing environment, in accordance with an illustrative embodiment of the invention.

DETAILED DESCRIPTION

Figure 1:
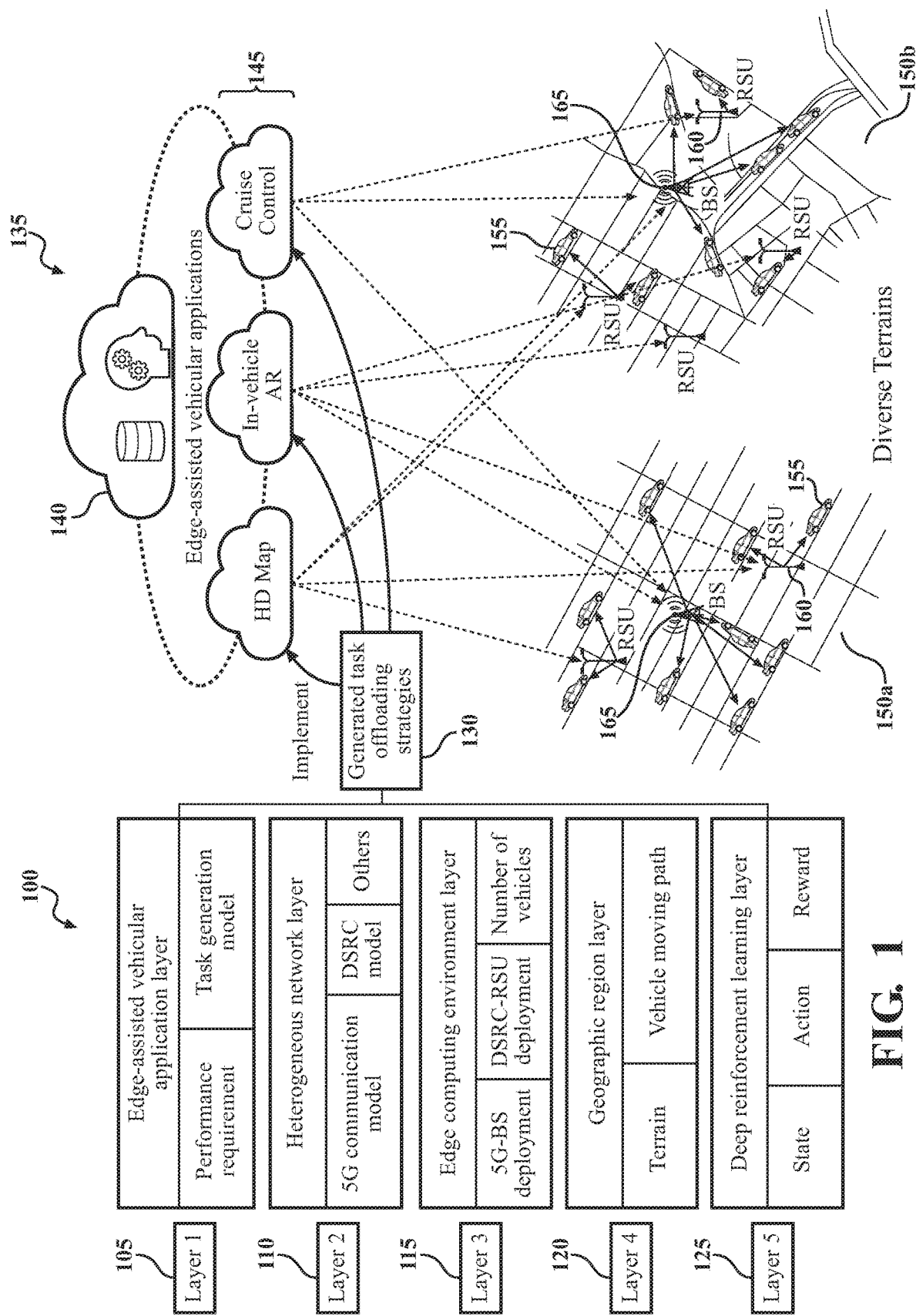
FIG. 1 is a diagram of a simulation platform for simulating a vehicular edge-computing environment to generate task offloading strategies that can be deployed in a real-world environment, in accordance with an illustrative embodiment of the invention.

Various embodiments of systems and methods for generating a task offloading strategy for a vehicular edge-computing environment are described herein. In some embodiments, those systems and methods are deployed in the context of a simulation platform or framework for simulating a vehicular edge-computing environment in which vehicles perform computational tasks associated with one or more edge-assisted vehicular applications. Examples of such applications include, without limitation, in-vehicle augmented reality, high-definition map generation, intelligent driving, and edge-assisted adaptive cruise control.

Several challenges arise in connection with the development of a practical, scalable, and efficient task offloading strategy (herein sometimes referred to as an "offloading strategy") in which connected vehicles can offload, to an edge server, a cloud server, or both, at least portions of the data associated with computational tasks to prevent the limited computational resources of the vehicles from becoming overloaded or overwhelmed.

First, it is difficult for a vehicle to capture multi-dimensionality information from the surrounding environment, such as the current and future behaviors of other vehicles, network status, the deployment of radio access nodes in the network, etc. In various embodiments, an edge server, whether simulated or actual, obtains network connections to various devices in the environment (e.g., base stations, roadside units, and vehicles) to gather multi-dimensionality information such as that mentioned above.

Second, a vehicular edge-computing environment is complex and difficult to model through human experience (e.g., simply changing a vehicle's location may vary the vehicular environment). In various embodiments, Deep Reinforcement Learning (DRL) provides a way for the system to keep learning continually and make decisions directly from the environment data instead of relying on a human experience-based model. Moreover, DRL considers the future feedback when making a present decision.

Third, since the embodiments described herein employ a technique referred to herein as "segmentation offloading," in which the data associated with a computational task is partitioned into segments of a predetermined transmission duration (with an associated predetermined amount of data), a system that generates offloading strategies makes numerous repeated decisions—one for each offloading segment—within a short time period. This makes it difficult to obtain a comprehensive, accurate, and real-time evaluation of what should be done during each segment using conventional optimization algorithms. In various embodiments, DRL provides a simple mapping solution in the form of a trained policy network (e.g., a multi-layer convolutional neural network), which enables a rapid and real-time segmentation-offloading decision in accordance with the environment information gathered at the edge server. The approach described herein, in various embodiments, may thus be termed "edge-assisted DRL-based segmentation offloading."

In the embodiments described herein, once the system has produced a trained policy network embodying an offloading strategy for segmentation offloading, the system can transmit a set of parameters specifying the trained policy network to a specific real-world edge server that deploys the offloading strategy in connection with a real-world vehicular edge-computing deployment.

Referring to FIG. 1, it is a diagram of a simulation platform 100 for simulating a vehicular edge-computing environment to generate task offloading strategies 130 that can be deployed in a real-world environment 135, in accordance with an illustrative embodiment of the invention. In this embodiment, simulation platform 100 can include a system for generating a task offloading strategy for a vehicular edge-computing environment, particularly in DRL layer 125 (Layer 5). As shown in FIG. 1, simulation platform 100 is divided into the following five layers: an edge-assisted vehicular application layer 105 (Layer 1); a heterogeneous network layer 110 (Layer 2); an edge-computing environment layer 115 (Layer 3); a geographic region layer 120 (Layer 4); and a DRL layer 125 (Layer 5). Each of these layers is discussed in further detail below. In other embodiments, simulation platform 100 may include other layers in addition to the five layers listed above, or it may include only some of the five layers listed above.

As indicated in FIG. 1, simulation platform 100 generates task offloading strategies 130 that can be deployed by an actual edge server 140 in diverse terrains (e.g., terrains 150a and 150b in FIG. 1) of a real-world environment 135 to support a variety of edge-assisted vehicular applications 145 in which one or more vehicles 155 communicate with edge server 140 or other network nodes via roadside units (RSUs) 160, base stations (BSs) 165, or both.

Edge-assisted vehicular application layer 105 (Layer 1) provides a user with the ability to simulate several edge-assisted vehicular applications 145 such as in-vehicle augmented reality (AR), high-definition (HD) map generation, intelligent driving, and edge-assisted adaptive cruise control having different service requirements (e.g., latency, computation, storage, etc.). As those skilled in the art are aware, "intelligent driving" is a broad term that includes a variety of assisted-driving applications such as adaptive cruise control, lane-change assistance, backup assistance, blind-spot detection, collision/pedestrian avoidance, etc. Input parameters to edge-assisted vehicular application layer 105 include performance requirements for the vehicular applications and task-generation models.

Heterogeneous network layer 110 (Layer 2) permits a user to specify different radio access models (5G, Dedicated Short-Range Communications or "DSRC," etc.) in simulation platform 100. For example, in one embodiment, the 5G module in heterogeneous network layer 110 is based on an ETSI 5G channel model and the applicable 3GPP standard, and the DSRC-RSU module is based on the IEEE 802.11p standard, which enables the data transmission between a simulated edge server 140 (a simulated counterpart to the real-world edge server 140 shown in FIG. 1) and one or more vehicles 155 to be realistically modeled. Input parameters to heterogeneous network layer 110 include selection of a 5G communication model, selection of a DSRC model, and other parameters.

Edge computing environment layer 115 (Layer 3) permits a user to simulate multiple edge-server 140 access infrastructures (e.g., 5G-BSs and/or DSRC-RSUs) and one or more vehicles 155. Input parameters to this layer can include the number and locations, in the simulated environment, of 5G-BSs 165, the number and locations, in the simulated environment, of DSRC-RSUs 160, and the number of vehicles 155 in the simulated environment.

Geographic region layer 120 (Layer 4) allows a user to choose different real-world or self-designed geographic regions (e.g., traffic circles, intersections, bridges, and freeway or expressway on-ramps and off-ramps) for conducting one or more simulation experiments to generate a task offloading strategy 130. Input parameters to this layer can include specifications of the terrain and vehicle moving-path data. The vehicle moving-path data can be either collected real-world data or simulation-generated data (e.g., Unity, Aimsun, etc.).

DRL layer 125 (Layer 5) permits a user to use various DRL algorithms to train a policy network (not shown in FIG. 1) to implement various offloading strategies for diverse terrains and edge-assisted vehicular applications 145. Input parameters to this layer can include state and action models that are connected with other layers of simulation platform 100 and user-defined reward models to guide the training process. Much of the remainder of this description focuses on DRL layer 125 (Layer 5), the layer of simulation platform 100 that is capable of generating task offloading strategies 130 that can be applied to an actual edge server 140.

Figure 2:
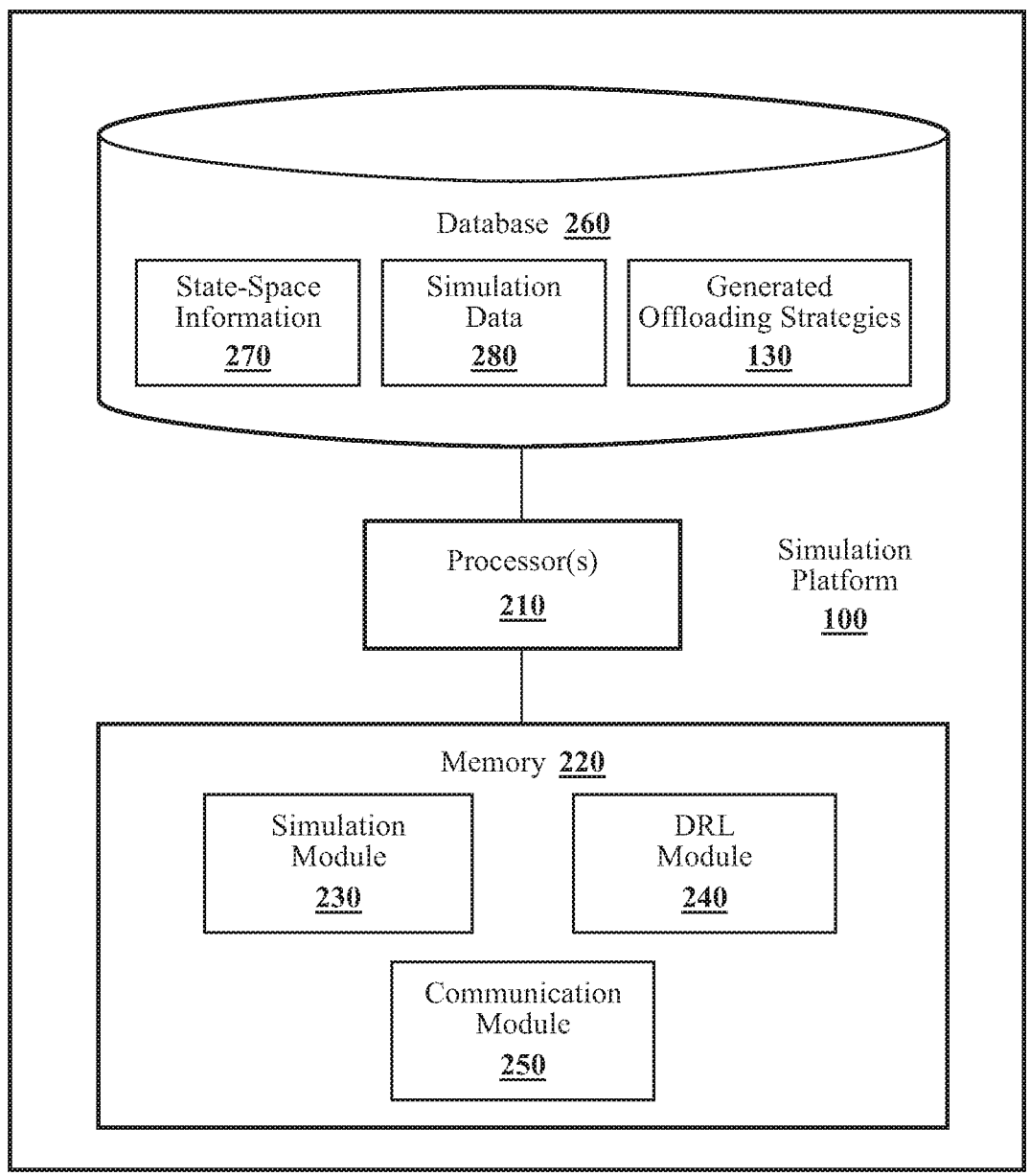
FIG. 2 is a functional block diagram of a simulation platform for generating a task offloading strategy for a vehicular edge-computing environment, in accordance with an illustrative embodiment of the invention.

FIG. 2 is a functional block diagram of a simulation platform 100 for generating a task offloading strategy 130 for a vehicular edge-computing environment, in accordance with an illustrative embodiment of the invention. In FIG. 2, simulation platform 100 includes one or more processors 210 to which a memory 220 is communicably coupled. In one embodiment, memory 220 stores a simulation module 230, a DRL module 240, and a communication module 250. The memory 220 is a random-access memory (RAM), read-only memory (ROM), a hard-disk drive, a flash memory, or other suitable memory for storing the modules 230, 240, and 250. The modules 230, 240, and 250 are, for example, computer-readable instructions that when executed by the one or more processors 210, cause the one or more processors 210 to perform the various functions disclosed herein. State-space information 270 regarding one or more vehicles 155 and one or more intermediate nodes (e.g., RSUs 160 and/or BSs 165) can be stored in a database 260. Various kinds of simulation data 280 (input parameters, computational models, intermediate results, etc.) can also be stored in database 260. The generated offloading strategies 130 produced by simulation platform 100, in particular DRL layer 125 (Layer 5), can also be stored in database 260.

Simulation module 230 generally includes instructions that when executed by the one or more processors 210 cause the one or more processors 210 to deploy simulation platform 100 to simulate a vehicular edge-computing environment in which one or more vehicles 155 perform computational tasks associated with one or more edge-assisted vehicular applications 145 (e.g., the kinds of vehicular applications mentioned above). In various embodiments, data associated with the computational tasks is partitioned into segments, which is discussed in further detail below. By virtue of its various layers discussed above, simulation platform 100 includes a simulated edge server 140. For example, DRL layer 125 (Layer 5) simulates an edge server 140 receiving the kind of multi-dimensionality information discussed above and other state-space information that is discussed more fully below. In some embodiments, the simulated edge server 140 includes a policy network. In some embodiments, the policy network includes a neural network.

DRL module 240 generally includes instructions that when executed by the one or more processors 210 cause the one or more processors 210 to perform, for each of a plurality of segments, a DRL training procedure for the policy network mentioned above. The DRL training procedure is an iterative process that can be performed for a plurality of offloading segments associated with the computational tasks of one or more simulated vehicles 155 engaged in simulated edge-assisted vehicular applications 145. The result of the DRL training procedure is a trained policy network that embodies an offloading strategy for segmentation offloading of computational tasks from vehicles 155 to an edge server 140, a cloud server (not shown in FIG. 1), or both. In some embodiments, the policy network is trained using a predetermined reward function, the trained policy network maximizing a cumulative reward computed in accordance with the predetermined reward function.

During the DRL training procedure, the instructions in DRL module 240 cause the one or more processors 210 to do the following for each of a plurality of segments in an iterative fashion:

Receive, at the simulated edge server 140, state-space information 270 regarding the one or more vehicles 155 and one or more intermediate network nodes. In some embodiments, the intermediate network nodes include RSUs 160, BSs 165, or both. As with edge server 140, simulation platform 100 can simulate these intermediate network nodes via, in particular, heterogeneous network layer 110 (Layer 2) and edge computing environment layer 115 (Layer 3).

Input the state-space information 270 to the policy network. The state-space information 270 is discussed in greater detail below in connection with FIG. 4.

Generate, from the policy network, an action concerning a current segment of a particular computational task associated with a particular vehicle 155 among the one or more vehicles 155, the action including (1) offloading the current segment via a specific BS 165, (2) offloading the current segment via a specific RSU 160, or (3) holding the current segment in a data buffer of the particular vehicle 155. The generated action thus represents a decision on the part of the policy-network-in-training to offload the current segment to a particular network node or to permit the particular vehicle 155 to hold the segment in its data buffer. When the offloading strategy embodied by a trained policy network (a generated task offloading strategy 130) is later deployed in an actual edge server 140, the edge server 140 communicates with participating connected vehicles 155 to instruct them to perform one of the three actions listed above for each segment. The connected vehicles 155 respond in accordance with the offloading instructions received from edge server 140.

Assign a reward to the policy network for the action in accordance with a predetermined reward function. The reward at each iteration (segment) can be accumulated to compute a cumulative reward for the overall DRL training procedure.

As mentioned above, the DRL training procedure carried out by DRL module 240 produces a trained policy network embodying an offloading strategy 130 for segmentation offloading of computational tasks from vehicles 155 to one or more of an edge server 140 and a cloud server.

Communication module 250 generally includes instructions that when executed by the one or more processors 210 cause the one or more processors 210 to transmit a set of parameters specifying a trained policy network to a particular actual edge server 140 that deploys the offloading strategy 130 in a real-world environment 135.

Figure 3:
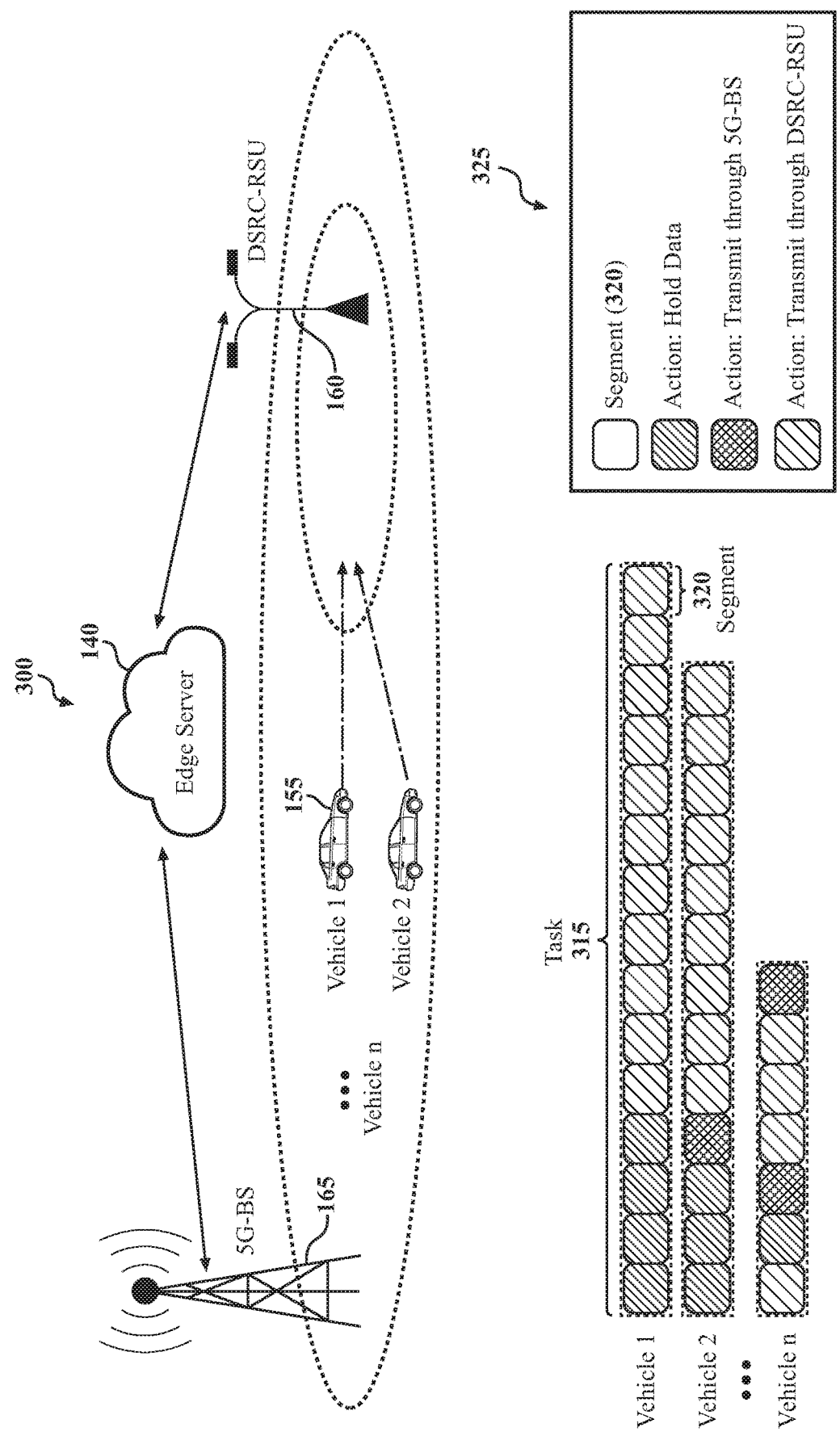
FIG. 3 illustrates the use of segmentation offloading in a vehicular edge-computing environment, in accordance with an illustrative embodiment of the invention.

FIG. 3 illustrates the use of segmentation offloading in a vehicular edge-computing environment, in accordance with an illustrative embodiment of the invention. FIG. 3 depicts a vehicular edge-computing environment 300 that can be simulated by simulation platform 100. Vehicular edge-computing environment 300 includes an edge server 140, at least one BS 165, at least one RSU 160, and n vehicles 155 that communicate with edge server 140 via the BSs 165 and/or the RSUs 160.

The lower portion of FIG. 3 diagrams segmentation offloading in accordance with the illustrated embodiment. A computational task 315 associated with a vehicular application is divided into segments 320. One example of a computational task is object detection and the rendering of images in the context of an in-vehicle AR application. In this embodiment, each segment 320 is a predetermined period of time during which a predetermined amount of data (e.g., a particular number of bits or bytes) can be transmitted from a vehicle 155 to another network node. The segments 320 can thus be viewed as timeslots during which portions of the data stored in a data buffer of a given vehicle 155 are either offloaded to another network node (e.g., an edge server 140 or a cloud server) or held (stored) in the data buffer. Each segment 320 can also be viewed as a particular quantity of data (i.e., the quantity of data that can be transmitted during a predetermined timeslot). Both meanings of "segment" are used interchangeably herein. As discussed above, in an actual edge-computing deployment, edge server 140 communicates with vehicles 155 to instruct them what to do with the buffered data during each segment 320. The possibilities are summarized in legend 325: (1) offloading the segment 320 via a specific BS 165, (2) offloading the segment 320 via a specific RSU 160, or (3) holding the segment 320 in the data buffer of the vehicle 155. Examples of tasks 315 and segmentation offloading for Vehicles 1, 2, and n are shown in FIG. 3 and are keyed to legend 325.

Figure 4:
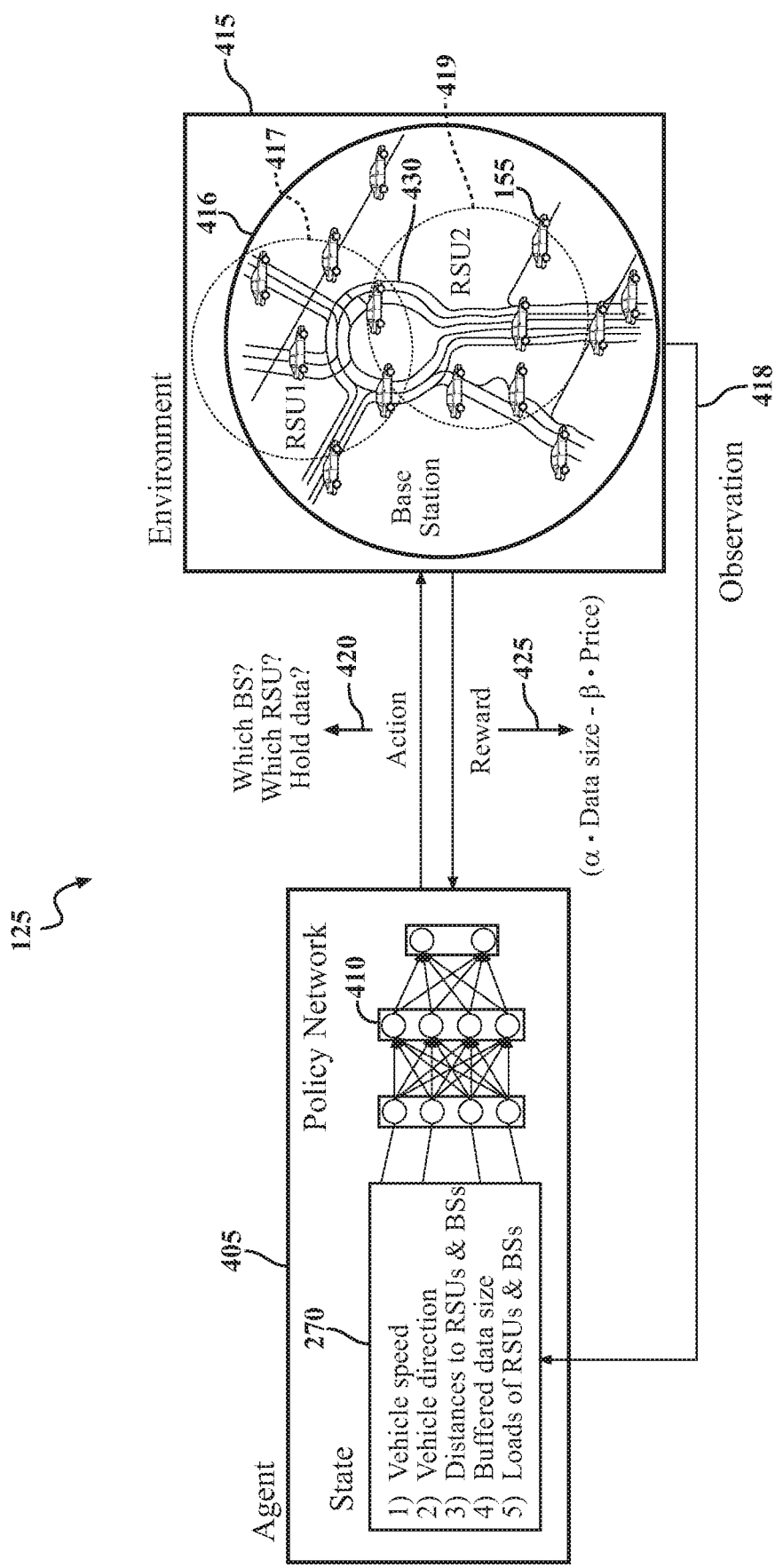
FIG. 4 is a block diagram of a Deep Reinforcement Learning (DRL) layer of a simulation platform for generating a task offloading strategy for a vehicular edge-computing environment, in accordance with an illustrative embodiment of the invention.

FIG. 4 is a block diagram of DRL layer 125 of simulation platform 100 for generating a task offloading strategy 130 for a simulated vehicular edge-computing environment 415, in accordance with an illustrative embodiment of the invention. FIG. 4 diagrams the DRL training procedure discussed above that is performed via DRL module 240. DRL layer 125 includes a learning agent 405 that includes a policy network 410. In some embodiments, policy network 410 includes a neural network. For example, in some embodiments, the neural network is a multi-layer convolutional neural network.

Learning agent 405 receives observation data 418 from simulated vehicular edge-computing environment 415. Simulated vehicular edge-computing environment 415 is provided by the other layers of simulation platform 100, as discussed above. Observation data 418 includes state-space information 270, which is input to policy network 410 during each segment 320 (refer to FIG. 3). In the embodiment of FIG. 4, state-space information 270 includes the following: (1) vehicle speed, (2) vehicle direction (heading), (3) distances to RSUs 160 and BSs 165, (4) vehicle buffer status (i.e., how full a given vehicle's data buffer is), and (5) the loading levels of RSUs 160 and BSs 165. In other embodiments, only some of the above five types of information are included in state-space information 270. In general, state-space information 270 includes one or more of the five types of information listed above.

Given the input state-space information 270 for the current segment 320 with respect to a particular computational task 315 associated with a particular vehicle 155, policy network 410 generates an action 420 for that segment 320. As discussed above, that action is one of the following: (1) offloading the segment via a specific BS 165, (2) offloading the segment via a specific RSU 160, or (3) holding the segment in the data buffer of the vehicle 155. DRL module 240, based on a predetermined reward function, assigns a reward 425 to the generated action 420. As discussed above, over a plurality of segments 320, DRL module 240 can accumulate the reward 425 to obtain a cumulative reward for the DRL training procedure. In one embodiment, the predetermined reward function for a given segment 320 is $\alpha \cdot \text{data size} - \beta \cdot \text{price}$, where $\alpha$ and $\beta$ are scaling parameters that can be used to adjust for a user's vehicular-application preferences. For example, a large $\alpha$ with a small $\beta$ corresponds to a vehicular application that benefits from low latency, whereas a small $\alpha$ with a large $\beta$ corresponds to a vehicular application where lower monetary cost is preferable. In summary, in this particular embodiment, the predetermined reward function includes a scaled segment size (the amount of data transmitted during a segment 320) minus a scaled data-transmission cost.

As shown in FIG. 4, simulated vehicular edge-computing environment 415 can include BS coverage area 416, RSU 1 coverage area 417, RSU 2 coverage area 419, and one or more vehicles 155.

Figure 5:
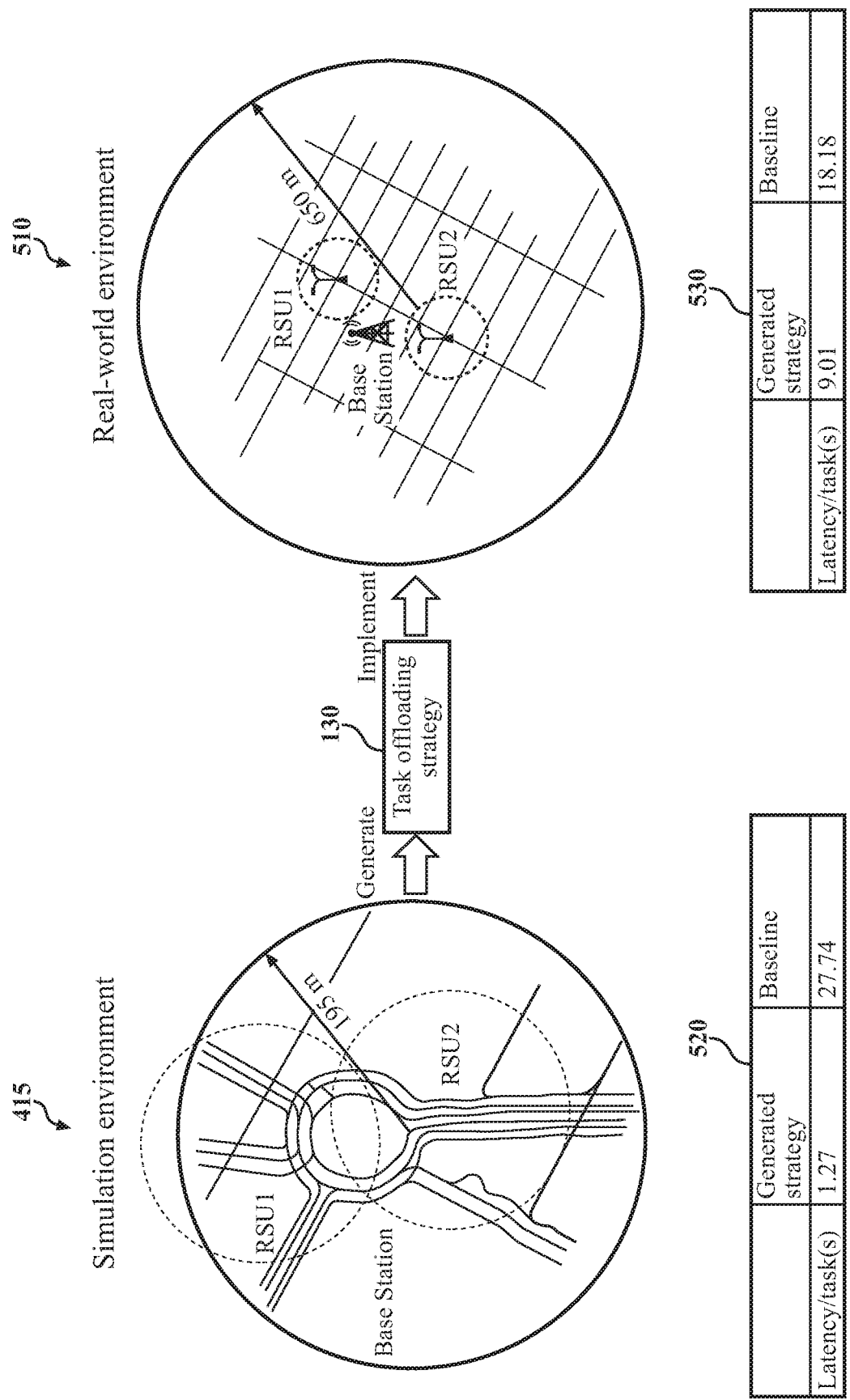
FIG. 5 illustrates applying a task offloading strategy generated by the DRL layer in FIG. 4 to a real-world environment, in accordance with an illustrative embodiment of the invention.

FIG. 5 illustrates applying a task offloading strategy 130 generated by the DRL layer 125 in FIG. 4 to a real-world environment 510, in accordance with an illustrative embodiment of the invention. In this illustrative application of simulation platform 100, a task offloading strategy 130 generated by DRL layer 125 (embodied as a trained policy network 410) in connection with simulated vehicular edge-computing environment 415 is applied to a real-world environment 510. Note that, in this example, the real-world environment 510 is not the same in its physical dimensions and characteristics (terrain, etc.) as simulated vehicular edge-computing environment 415. Nevertheless, parameters specifying the trained policy network 410 corresponding to task offloading strategy 130 can be transmitted to an actual edge server 140 (not shown in FIG. 5) in real-world environment 510 to assess the performance of the task offloading strategy 130 in real-world environment 510. Specifically, a user can compare the simulated results 520 with the real-world results 530. In a different embodiment, the real-world environment 510 can more closely match the simulated vehicular edge-computing environment 415. In one embodiment, the real-world environment 510 closely matches the simulated vehicular edge-computing environment 415 so that predictions can be made regarding the performance attainable in the real-world environment 510 based on the simulated results 520.

FIG. 6 is a flowchart of a method 600 of generating a task offloading strategy 130 for a vehicular edge-computing environment 415, in accordance with an illustrative embodiment of the invention. Method 600 will be discussed from the perspective of the simulation platform 100 in FIG. 2 and with reference to FIGS. 3 and 4. While method 600 is discussed in combination with simulation platform 100, it should be appreciated that method 600 is not limited to being implemented within simulation platform 100, but simulation platform 100 is instead one example of a system that may implement method 600.

At block 610, simulation module 230 deploys a simulation platform 100 that simulates a vehicular edge-computing environment 415 in which one or more vehicles 155 perform computational tasks associated with one or more edge-assisted vehicular applications 145. In various embodiments, data associated with those computational tasks is partitioned into segments, as discussed above. By virtue of its various layers discussed above, simulation platform 100 includes a simulated edge server 140. In some embodiments, the simulated edge server 140 includes a policy network 410. In some embodiments, the policy network 410 includes a neural network (e.g., a convolutional neural network).

At block 620, DRL module 240 performs, for each of a plurality of segments 320, a DRL training procedure to produce a trained policy network 410 embodying an offloading strategy 130 for segmentation offloading of computational tasks from vehicles 155 to one or more of an edge server 140 and a cloud server. The specific actions performed during the DRL training procedure are discussed above and are summarized in blocks 630-670 of the flowchart in FIG. 6.

At block 630, if there are more segments 320 to process, control proceeds to block 640. Otherwise, control skips to block 680.

At block 640, a simulated edge server 140 in simulation platform 100 (e.g., in DRL layer 125) receives, from various layers of simulation platform 100, state-space information 270 regarding the one or more vehicles 155 and one or more intermediate network nodes (e.g., RSUs 160, BSs 165, or both). In some embodiments (e.g., see FIG. 4), state-space information 270 includes the following: (1) vehicle speed, (2) vehicle direction (heading), (3) distances to RSUs 160 and BSs 165, (4) vehicle buffer status (i.e., how full a given vehicle's data buffer is), and (5) the loading levels of RSUs 160 and BSs 165. In other embodiments, only some of the above five types of information are included in state-space information 270. In general, state-space information 270 includes one or more of the five types of information listed above.

At block 650, the received state-space information 270 for the current segment 320 is input to policy network 410 (refer to FIG. 3).

At block 660, the policy network 410 generates an action 420 concerning a current segment 320 of a particular computational task associated with a particular vehicle 155 among the one or more vehicles 155 that includes (1) offloading the current segment 320 via a specific BS 165, (2) offloading the current segment 320 via a specific RSU 160, or (3) holding the current segment 320 in a data buffer of the vehicle 155. The generated action 420 thus represents a decision on the part of the policy-network-in-training (410) to offload the current segment 320 to a particular network node or to permit the particular vehicle 155 to hold the segment 320 in its data buffer. As discussed above, when the offloading strategy 310 embodied by a trained policy network 410 is later deployed in an actual edge server 140, the edge server 140 communicates with connected vehicles 155 to instruct them to perform one of the three actions 420 listed above for each offloading segment 320. The connected vehicles 155 respond in accordance with the offloading instructions received from the edge server 140.

At block 670, DRL module 240 assigns a reward 425 to the policy network 410 for the action 420 in accordance with a predetermined reward function. As discussed above, in one embodiment, the predetermined reward function for a given segment 320 is $\alpha \cdot \text{data size} - \beta \cdot \text{price}$, where $\alpha$ and $\beta$ are scaling parameters that can be used to adjust for a user's vehicular-application preferences. For example, a large $\alpha$ with a small $\beta$ corresponds to a vehicular application that benefits from low latency, whereas a small $\alpha$ with a large $\beta$ corresponds to a vehicular application where lower monetary cost is preferable. In summary, in one embodiment, the predetermined reward function includes a scaled segment size (the amount of data transmitted during a segment 320) minus a scaled data-transmission cost.

As indicated in FIG. 6, blocks 630-670 are performed iteratively until all segments 320 have been processed, at which time control skips to block 680.

At block 680, DRL module 240 produces, via the now-completed DRL training procedure, a trained policy network 410. During the iterative DRL training procedure, the rewards 425 assigned to the actions 420 can be accumulated to produce a cumulative reward for the plurality of segments 320 processed during the simulation run. As discussed above, the trained policy network 410 obtained upon completion of the DRL training procedure maximizes the cumulative reward computed in accordance with the predetermined reward function. The trained policy network 410 thus embodies an offloading strategy 130 for segmentation offloading of computational tasks from vehicles 155 to one or more of an edge server 140 and a cloud server.

In other embodiments, method 600 includes additional actions that are not included in the flowchart of FIG. 6. For example, in one embodiment, communication module 250 of simulation platform 100 transmits a set of parameters specifying the trained policy network 410 to a particular edge server 140 that deploys the offloading strategy 130.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for generating a task offloading strategy for a vehicular edge-computing environment, comprising:
    one or more processors; and
    a memory communicably coupled to the one or more processors and storing:
    a simulation module including instructions that when executed by the one or more processors cause the one or more processors to deploy a simulation platform that simulates a vehicular edge-computing environment in which one or more vehicles perform computational tasks associated with one or more vehicular applications, wherein data associated with the computational tasks is partitioned into segments, the simulation platform includes a simulated edge server, the simulated edge server includes a policy network, and the policy network includes a neural network; and
    a Deep Reinforcement Learning (DRL) module including instructions that when executed by the one or more processors cause the one or more processors to perform, for each of a plurality of segments, a Deep Reinforcement Learning (DRL) training procedure in which the one or more processors:
        receive, at the simulated edge server, state-space information regarding the one or more vehicles and one or more intermediate network nodes, the one or more intermediate network nodes including at least one of base stations and roadside units;
        input the state-space information to the policy network;

generate, from the policy network, an action concerning a current segment of a particular computational task associated with a particular vehicle among the one or more vehicles, the action including one of offloading the current segment via a specific base station, offloading the current segment via a specific roadside unit, and holding the current segment in a data buffer of the particular vehicle; and assign a reward to the policy network for the action in accordance with a predetermined reward function;

wherein the instructions in the DRL module cause the one or more processors, via the DRL training procedure, to produce a trained policy network embodying an offloading strategy for segmentation offloading of computational tasks from vehicles to one or more of an edge server and a cloud server.

2. The system of claim 1, further comprising a communication module including instructions that when executed by the one or more processors cause the one or more processors to transmit a set of parameters specifying the trained policy network to a particular edge server that deploys the offloading strategy.

3. The system of claim 1, wherein the one or more vehicular applications include one or more of in-vehicle augmented reality, high-definition map generation, intelligent driving, and edge-assisted adaptive cruise control.

4. The system of claim 1, wherein the neural network is a multi-layer convolutional neural network.

5. The system of claim 1, wherein the state-space information includes one or more of vehicle speed, vehicle direction, distances to roadside units and base stations, vehicle data buffer status, and loading levels of roadside units and base stations.

6. The system of claim 1, wherein the predetermined reward function includes a scaled segment size minus a scaled data transmission cost.

7. The system of claim 1, wherein the simulation platform includes an edge-assisted vehicular application layer, a heterogeneous network layer, an edge computing environment layer, a geographic region layer, and a DRL layer.

8. A non-transitory computer-readable medium for generating a task offloading strategy for a vehicular edge-computing environment and storing instructions that when executed by one or more processors cause the one or more processors to:

deploy a simulation platform that simulates a vehicular edge-computing environment in which one or more vehicles perform computational tasks associated with one or more vehicular applications, wherein data associated with the computational tasks is partitioned into segments, the simulation platform includes a simulated edge server, the simulated edge server includes a policy network, and the policy network includes a neural network;

perform, for each of a plurality of segments, a Deep Reinforcement Learning (DRL) training procedure in which the one or more processors:

receive, at the simulated edge server, state-space information regarding the one or more vehicles and one or more intermediate network nodes, the one or more intermediate network nodes including at least one of base stations and roadside units;

input the state-space information to the policy network;

generate, from the policy network, an action concerning a current segment of a particular computational task associated with a particular vehicle among the one or more vehicles, the action including one of offloading the current segment via a specific base station, offloading the current segment via a specific roadside unit, and holding the current segment in a data buffer of the particular vehicle; and assign a reward to the policy network for the action in accordance with a predetermined reward function; and produce, via the DRL training procedure, a trained policy network embodying an offloading strategy for segmentation offloading of computational tasks from vehicles to one or more of an edge server and a cloud server.

9. The non-transitory computer-readable medium of claim 8, wherein the instructions further include instructions that when executed by one or more processors cause the one or more processors to transmit a set of parameters specifying the trained policy network to a particular edge server that deploys the offloading strategy.

10. The non-transitory computer-readable medium of claim 8, wherein the one or more vehicular applications include one or more of in-vehicle augmented reality, high-definition map generation, intelligent driving, and edge-assisted adaptive cruise control.

11. The non-transitory computer-readable medium of claim 8, wherein the neural network is a multi-layer convolutional neural network.

12. The non-transitory computer-readable medium of claim 8, wherein the state-space information includes one or more of vehicle speed, vehicle direction, distances to roadside units and base stations, vehicle data buffer status, and loading levels of roadside units and base stations.

13. The non-transitory computer-readable medium of claim 8, wherein the predetermined reward function includes a scaled segment size minus a scaled data transmission cost.

14. A method of generating a task offloading strategy for a vehicular edge-computing environment, the method comprising:

deploying a simulation platform that simulates a vehicular edge-computing environment in which one or more vehicles perform computational tasks associated with one or more vehicular applications, wherein data associated with the computational tasks is partitioned into segments, the simulation platform includes a simulated edge server, the simulated edge server includes a policy network, and the policy network includes a neural network;

performing, for each of a plurality of segments, a Deep Reinforcement Learning (DRL) training procedure that includes:

receiving, at the simulated edge server, state-space information regarding the one or more vehicles and one or more intermediate network nodes, the one or more intermediate network nodes including at least one of base stations and roadside units;

inputting the state-space information to the policy network;

generating, from the policy network, an action concerning a current segment of a particular computational task associated with a particular vehicle among the one or more vehicles, the action including one of offloading the current segment via a specific base station, offloading the current segment via a specific roadside unit, and holding the current segment in a data buffer of the particular vehicle; and assigning a reward to the policy network for the action in accordance with a predetermined reward function; and producing, via the DRL training procedure, a trained policy network embodying an offloading strategy for segmentation offloading of computational tasks from vehicles to one or more of an edge server and a cloud server.

15. The method of claim 14, further comprising transmitting a set of parameters specifying the trained policy network to a particular edge server that deploys the offloading strategy.

16. The method of claim 14, wherein the one or more vehicular applications include one or more of in-vehicle augmented reality, high-definition map generation, intelligent driving, and edge-assisted adaptive cruise control.

17. The method of claim 14, wherein the neural network is a multi-layer convolutional neural network.

18. The method of claim 14, wherein the state-space information includes one or more of vehicle speed, vehicle direction, distances to roadside units and base stations, vehicle data buffer status, and loading levels of roadside units and base stations.

19. The method of claim 14, wherein the predetermined reward function includes a scaled segment size minus a scaled data transmission cost.

20. The method of claim 14, wherein the simulation platform includes an edge-assisted vehicular application layer, a heterogeneous network layer, an edge computing environment layer, a geographic region layer, and a DRL layer.

* * * * *